(12) United States Patent
Long (10) Patent No.: US 8,897,136 B2
(45) Date of Patent: Nov. 25, 2014

(54) PSEUDOWIRE SETUP METHOD AND NODE DEVICE

(75) Inventor: Hao Long, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 315 days.

(21) Appl. No.: 13/422,592

(22) Filed: Mar. 16, 2012

(65) Prior Publication Data
US 2012/0170461 A1 Jul. 5, 2012

Related U.S. Application Data

(63) Continuation of application No. PCT/CN2010/075458, filed on Jul. 26, 2010.

(30) Foreign Application Priority Data

Sep. 17, 2009 (CN) .......................... 2009 1 0173932

(51) Int. Cl.
*H04L 1/00* (2006.01)
*H04L 12/927* (2013.01)
*H04L 12/911* (2013.01)
*H04L 12/913* (2013.01)
*H04L 12/721* (2013.01)
*H04L 12/723* (2013.01)

(52) U.S. Cl.
CPC .............. *H04L 45/50* (2013.01); *H04L 47/805* (2013.01); *H04L 47/825* (2013.01); *H04L 47/724* (2013.01); *H04L 45/68* (2013.01)
USPC ........................................................ 370/235

(58) Field of Classification Search
CPC ................................ H04L 45/50; H04L 45/68
See application file for complete search history.

(56) References Cited

U.S. PATENT DOCUMENTS 8,611,359 B1 * 12/2013 Kompella et al. ............. 370/401
2004/0156313 A1 8/2004 Hofmeister et al.
(Continued)

FOREIGN PATENT DOCUMENTS

CN 1859264 A 11/2006
CN 101345714 A 1/2009
(Continued)

OTHER PUBLICATIONS

Awduche, et al., "RSVP-TE: Extensions to RSVP for LSP Tunnels", Network Working Group, Request for Comments: 3209, pp. 1-62, (Dec. 2001).

(Continued)

*Primary Examiner* — Clemence Han
(74) *Attorney, Agent, or Firm* — Slater & Matsil, L.L.P.

(57) ABSTRACT

Embodiments of the present invention provide a pseudowire setup method and a node device. The method includes: receiving, by a node, a label mapping message which carries a bandwidth required by a service and a service level of the service; judging, by the node, whether the LSP in which the node is located supports the service level of the service and the bandwidth of the service, according to bandwidth supporting information, which is stored in the node, of a Label Switching Path (LSP) in which the node is located, and the bandwidth required by the service and the service level of the service which are carried in the label mapping message; and using the LSP as an LSP which bears a pseudowire when judging that the LSP supports the service level of the service and the bandwidth of the service. In this way, the Quality of Service (QoS) of the established pseudowire is ensured.

13 Claims, 6 Drawing Sheets

| Service priority | Bandwidth quota | Forward remaining bandwidth quota | Reverse remaining bandwidth quota |
|---|---|---|---|
| 7 | 100M | 20M | 30M |
| 6 | 200M | 40M | 50M |
| 5 | 300M | 100M | 90M |
| 4 | 300M | 40M | 30M |
| 3 | 400M | 150M | 120M |
| 2 | 400M | 120M | 150M |
| 1 | 400M | 80M | 80M |
| 0 | 400M | 90M | 100M |

(56) References Cited

U.S. PATENT DOCUMENTS

| | | | |
|---|---|---|---|
| 2007/0237150 A1* | 10/2007 | Wood | 370/392 |
| 2007/0280102 A1* | 12/2007 | Vasseur et al. | 370/225 |
| 2007/0286090 A1 | 12/2007 | Rusmisel et al. | |
| 2010/0103815 A1* | 4/2010 | Kotrla et al. | 370/229 |
| 2010/0214909 A1* | 8/2010 | Ceccarelli et al. | 370/228 |
| 2010/0303082 A1* | 12/2010 | Wood | 370/400 |
| 2011/0182185 A1* | 7/2011 | Vigoureux et al. | 370/241.1 |
| 2011/0182186 A1* | 7/2011 | Vigoureux et al. | 370/241.1 |
| 2011/0255400 A1* | 10/2011 | Kotrla et al. | 370/229 |

FOREIGN PATENT DOCUMENTS

| | | |
|---|---|---|
| CN | 101485163 A | 7/2009 |
| CN | 101656673 A | 2/2010 |

OTHER PUBLICATIONS

Bitar, et al., "Requirements for inter domain Pseudo-Wires", draft-ietf-pwe3-ms-pw-requirements-03.txt, Network Working Group, Internet Draft, pp. 1-26, (Oct. 2006).

Martini, et al., "Dynamic Placement of Multi Segment Pseudo Wires", draft-ietf-pwe3-dynamic-ms-pw-09.txt, Network Working Group, Internet Draft, pp. 1-20, (Mar. 9, 2009).

Martini, et al., "Pseudowire Setup and Maintenance Using the Label Distribution Protocol (LDP)", Network Working Group, Request for Comments: 4447, Internet, Draft, pp. 1-33, (Apr. 2006).

Rejection Decision of Chinese Application No. 200910173932.5 mailed Sep. 16, 2011.

First Chinese Office Action of Chinese Application No. 200910173932.5 mailed Aug. 3, 2010.

Aggarwal, et al., "Setup and Maintenance of Pseudowires using RSVP-TE", draft-raggarwa-rsvpte-pw-03.txt, Network Working Group, Internet Draft, pp. 1-18 (Oct. 2005).

Second Chinese Office Action of Chinese Application No. 200910173932.5 mailed May 5, 2011.

English-language Written Opinion of the International Searching Authority from the State IP Office in China in International Application No. PCT/CN2010/075458 dated Nov. 25, 2010.

Extended European Search Report from the European Patent Office in Application No. 10816634.9-2416 PCT/CN2010/075458 dated May 15, 2012.

English-language International Search Report from the Chinese Patent Office in International Application No. PCT/CN2010/075458 dated Nov. 25, 2010.

Notification of Reexamination of Chinese Application No. 200910173932.5 mailed Mar. 28, 2013, 16 pages. (Partial Translation).

* cited by examiner

| Service priority | Bandwidth quota | Forward remaining bandwidth quota | Reverse remaining bandwidth quota |
|---|---|---|---|
| 7 | 100M | 20M | 30M |
| 6 | 200M | 40M | 50M |
| 5 | 300M | 100M | 90M |
| 4 | 300M | 40M | 30M |
| 3 | 400M | 150M | 120M |
| 2 | 400M | 120M | 150M |
| 1 | 400M | 80M | 80M |
| 0 | 400M | 90M | 100M |

FIG. 4

| Service availability | Bandwidth quota | Forward remaining bandwidth quota | Reverse remaining bandwidth quota |
|---|---|---|---|
| 99.999% | 100M | 20M | 30M |
| 99.995% | 200M | 40M | 50M |
| 99.99% | 300M | 100M | 90M |
| 99.98% | 300M | 40M | 30M |
| 99.95% | 400M | 150M | 120M |
| 99.9% | 400M | 120M | 150M |

PSEUDOWIRE SETUP METHOD AND NODE DEVICE

CROSS-REFERENCE TO RELATED APPLICATIONS

This application is a continuation of International Application No. PCT/CN2010/075458, filed on Jul. 26, 2010, which claims priority to Chinese Patent Application No. 200910173932.5, filed on Sep. 17, 2009, both of which are hereby incorporated by reference in their entireties.

FIELD OF THE INVENTION

The present invention relates to the communication field, and in particular, to a pseudowire setup method and a node device.

BACKGROUND OF THE INVENTION

In recent years, Internet Protocol (IP) services are growing rapidly, and have become a mainstream service type in place of Time Division Multiplexing (TDM) services, and the network traffic is increasing quickly. However, a traditional Synchronous Digital Hierarchy (SDH)/Multi-Service Transport Platform (MSTP) device is unable to make full use of the statistic multiplexing characteristics of a packet service, and unable to meet the increasingly stringent bandwidth requirement. Therefore, a Packet Transport Network (PTN) device begins to replace the SDH device.

Microwaves are widely applied in operator networks. Currently, SDH microwaves and Plesiochronous Digital Hierarchy (PDH) microwaves are prevalent. With the PTN device replacing the SDH device, the packet microwave device begins to correspondingly replace the SDH/PDH microwave device accordingly, and has been applied massively in the market in recent years.

Pseudowire Edge to Edge Emulation (PWE3) has achieved a great market success in recent years. PWE3 allows edge-to-edge emulation of different services in the network made up of data devices, such that the data network may support different service types. This is implemented by pseudowire in a manner that, by configuring a mapping relationship among a service, a pseudowire label and the packet switching path at two ends of the packet switching path, the pseudowires present on a mapping packet switching path become a layer between the service and the packet switching path, and separates the packet switching path from the service, allowing the packet switching to deal with various services in a nondiscriminatory way by imparting some features to the pseudowire. Generally, a packet switching path bears multiple pseudowires. In addition, multi-hop pseudowire means that a pseudowire traverses multiple packet switching paths, which usually occurs when the emulated service extends across different domains.

Pseudowire setup is aiming at setting up the mapping relationship among the service, the pseudowire label, and the packet switching path automatically. Current multi-hop pseudowire setup method includes sending a label mapping message on the originating side according to a Label Distribution Protocol (LDP) signaling, in which the label mapping message carries a pseudowire label, an explicit route (IP address of each node), and bandwidth information; configuring the mapping relationship related to the pseudowire label on each hop; selecting the packet switching path to the next hop according to bandwidth information and next hop IP address; configuring correspondingly to generate the pseudowire label to the next hop and then forwarding the label mapping message to the next hop. In this way, after the label mapping message passes through all nodes, the pseudowire configuration in a single direction is completed. After bidirectional pseudowire configuration is completed through a reverse mapping process, the pseudowire is set up.

The prior art has at least the following disadvantages. Because the bandwidth allocated to services with different service levels is not bounded, when the pseudowire is applied to the packet microwave device, the following problem occurs. The bandwidth of the microwave link varies with weather conditions, but the bandwidth allocated to services with different service levels is not bounded, and therefore, services with low service level and services with high service level will share bandwidth; when the bandwidth decreases, if too many pseudowires are set up on the packet switching path to emulate the services with high service level, the service packets with high service level may be discarded or interrupted, and the services with low service level may occupy too much bandwidth. The Quality of Service (QoS) of the established pseudowire is hard to be ensured.

SUMMARY OF THE INVENTION

Embodiments of the present invention provide a pseudowire setup method and a node device to ensure QoS of an established pseudowire.

According to one aspect, an embodiment of the present invention provides a pseudowire setup method, including: receiving, by a node, a label mapping message that carries a bandwidth required by a service and a service level of the service; judging, by the node, whether the LSP in which the node is located supports the service level of the service and the bandwidth of the service according to bandwidth supporting information, which is stored in the node, of a Label Switching Path (LSP) in which the node is located, and the bandwidth required by the service and the service level of the service that are carried in the label mapping message; using the LSP as an LSP which bears a pseudowire when judging that the LSP supports the service level of the service and the bandwidth of the service.

According to another aspect, an embodiment of the present invention provides a node device, including: a storage unit, configured to store bandwidth supporting information of an LSP in which the node device is located; a receiving unit, configured to receive a label mapping message that carries a bandwidth required by a service and a service level of the service; a processing unit, configured to: judge whether the LSP in which the node device is located supports the service level of the service and the bandwidth of the service according to the bandwidth supporting information, which is stored by the storage unit, of the LSP in which the node device is located, and the bandwidth required by the service and the service level of the service that are carried in the label mapping message, and use the LSP as an LSP which bears a pseudowire when judging that the LSP supports the service level of the service and the bandwidth of the service.

The foregoing technical solutions have the following benefits: judging whether the LSP in which the node is located supports the service level of the service and the bandwidth of the service according to the bandwidth supporting information, which is stored in the node, of the LSP in which the node is located and the bandwidth required by the service and the service level of the service that are carried in the label mapping message; and using the LSP as an LSP which bears a pseudowire when it is judged that the LSP supports the service level of the service and the bandwidth of the service, thus determining the service level of the service allowed to pass through the LSP and the bandwidth corresponding to the service level by configuring the bandwidth supporting information, which is stored in the node, of the LSP in which the node is located. Therefore, services in different service levels may be treated discriminatorily according to requirements, and the QoS of the pseudowire may be ensured when the bandwidth decreases.

BRIEF DESCRIPTION OF THE DRAWINGS

To make the technical solutions in the embodiments of the present invention or the prior art clearer, the following outlines accompanying drawings involved in the description of the embodiments or the prior art. Apparently, the accompanying drawings outlined below are merely part of the embodiments of the present invention. Persons of ordinary skill in the art may also derive other drawings from the accompanying drawings without creative efforts.

DETAILED DESCRIPTION OF THE EMBODIMENTS

The following detailed description is given in conjunction with the accompanying drawings to provide a clear and thorough understanding of the present invention. Evidently, the described embodiments are merely part of, rather than all, of the embodiments of the present invention. All other embodiments, which may be derived by those of ordinary skill in the art from the embodiments of the present invention without creative efforts, shall fall within the scope of the present invention.

Embodiment 1

FIG. 1 is a flowchart of a pseudowire setup method according to an embodiment of the present invention. The method includes the following steps.

101a: A node receives a label mapping message that carries a bandwidth required by a service and a service level of the service.

Here, the service level refers to a level of importance of various services measured from a certain measure perspective, where the measure perspective may be a service priority, service type, or service availability.

Specifically, the service level includes one or more of the service priority, service availability, and service type.

Specifically, the node on one end of a microwave link tunnel receives the label mapping message. Optionally, before receiving the label mapping message, the method may include: according to bandwidth of the microwave link in different environments, using a network management system or a signaling to configure information about multiple service levels and the remaining bandwidth quota corresponding to the multiple service levels on the nodes on both ends of the microwave link tunnel. Preferably, the node is located on one end of the microwave link; and according to the bandwidth of the microwave link in different environments, the node stores the information about service levels of multiple services supported by the LSP in which the node is located and the remaining bandwidth quota corresponding to the multiple service levels.

102a: According to bandwidth supporting information, which is stored in the node, of the LSP in which the node is located, and the bandwidth required by the service and the service level of the service that are carried in the label mapping message, the node judges whether an LSP in which the node is located supports the service level of the service and the bandwidth of the service.

Specifically, the bandwidth supporting information includes service levels of multiple services supported by the LSP in which the node is located and the remaining bandwidth quota corresponding to the multiple service levels. According to the bandwidth supporting information of the LSP in which the node is located, and the bandwidth required by the service and the service level of the service that are carried in the label mapping message, the node judges whether the LSP in which the node is located supports the service level of the service and the bandwidth of the service, including: comparing, by the node, the obtained service level of the service and bandwidth required by the service with the stored service level and remaining bandwidth quota corresponding to the service level; and when determining that the LSP supports the service level of the service, and the remaining bandwidth quota corresponding to the service level of the service is greater than the bandwidth required by the service, judging that the LSP supports the bandwidth required by the service in the service level.

103a: Use the LSP as an LSP which bears a pseudowire when judging that the LSP supports the service level of the service and the bandwidth of the service.

In this step, the label mapping message may further include a pseudowire label; and the pseudowire label may be also obtained from the label mapping message; and a mapping relationship between the pseudowire label and the LSP may be configured. The label mapping message may further include a source node identifier; and error information is returned to the source node according to the source node identifier when it is judged that the LSP in which the node is located fails to support the service level of the service and/or the bandwidth of the service (namely, the LSP may not support the service level; or the LSP may support the service level but the remaining bandwidth quota corresponding to the service level is not enough).

In the embodiment of the present invention, whether the LSP in which the node is located supports the service level of the service and the bandwidth of the service is judged according to the bandwidth supporting information, which is stored in the node, of the LSP in which the node is located and the bandwidth required by the service and service level of the service that are carried in the label mapping message; and the LSP is used as an LSP which bears the pseudowire when it is judged that the LSP supports the service level of the service and the bandwidth of the service. Because the bandwidth supporting information, which is stored in the node, of the LSP in which the node is located may be configured, the service level of the service allowed to pass through the LSP and the bandwidth corresponding to the service level may be decided. Therefore, services with different service levels may be treated discriminatorily according to requirements, and the QoS of the established pseudowire may be ensured when the bandwidth decreases.

Embodiment 2

Figure 1:
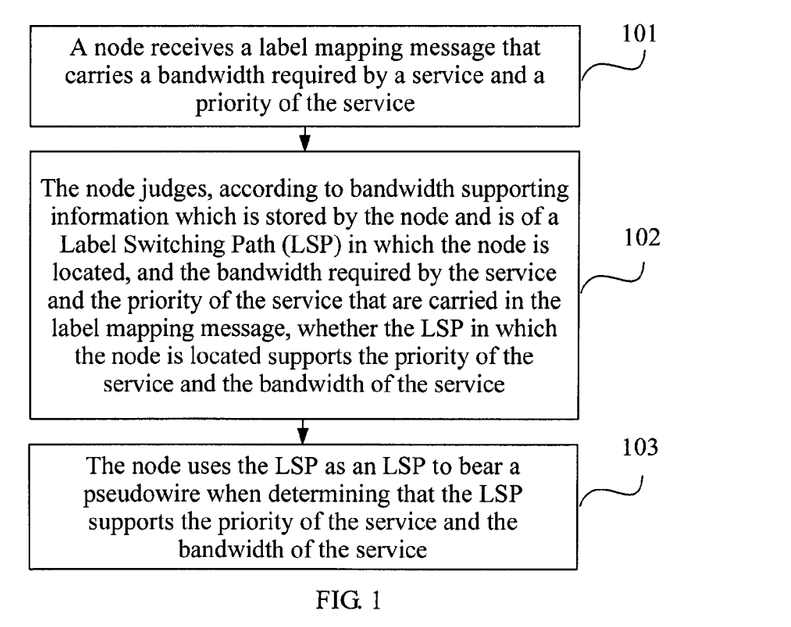
FIG. 1 is a flowchart of another pseudowire setup method according to an embodiment of the present invention.
Figure 1A:
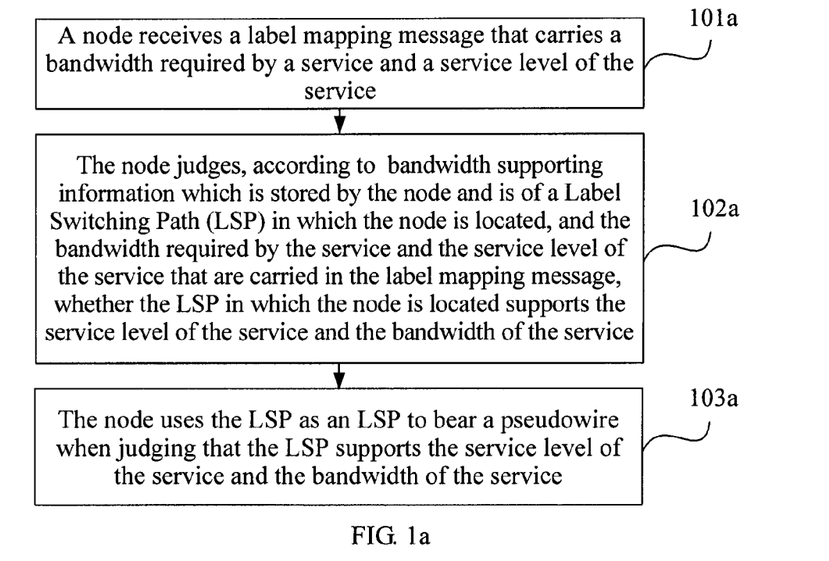
FIG. 1a is a flowchart of a pseudowire setup method according to an embodiment of the present invention.

FIG. 1 is a flowchart of a pseudowire setup method according to the embodiment of the present invention. The method includes the following steps.

101: A node receives a label mapping message that carries a bandwidth required by a service and a priority of the service.

Specifically, a node on one end of a microwave link tunnel receives the label mapping message. Optionally, before receiving the label mapping message, the method may include: according to bandwidth of the microwave link in different environments, configuring, by a gateway, information about multiple service priorities and the remaining bandwidth quota corresponding to the multiple service priorities on the nodes on both ends of the microwave link tunnel. Preferably, the node is located on one end of the microwave link; according to the bandwidth of the microwave link in different environments, the node stores the information about service priorities of multiple services supported by the LSP in which the node is located and the remaining bandwidth quota corresponding to the multiple priorities.

102: According to the bandwidth supporting information, which is stored in the node, of the LSP in which the node is located, and the bandwidth required by the service and the priority of the service that are carried in the label mapping message, the node judges whether the LSP in which the node is located supports the priority of the service and the bandwidth of the service.

Specifically, the bandwidth supporting information includes multiple service priorities supported by the LSP in which the node is located and the remaining bandwidth quota corresponding to the multiple priorities. According to the bandwidth supporting information, which is stored in the node, of the LSP in which the node is located, and the bandwidth required by the service and the priority of the service that are carried in the label mapping message, the node judges whether the LSP in which the node is located supports the priority of the service and the bandwidth of the service, including: comparing, by the node, the obtained priority of the service and bandwidth required by the service with the stored priority and remaining bandwidth quota; and when it is determined that the LSP supports the priority of the service, and the remaining bandwidth quota corresponding to the priority of the service is greater than the bandwidth required by the service, judging that the LSP supports the bandwidth required by the service of the priority.

103: Use the LSP as an LSP which bears a pseudowire when judging that the LSP supports the priority of the service and the bandwidth of the service.

In this step, the label mapping message may further include a pseudowire label; and the pseudowire label may be obtained from the label mapping message; and a mapping relationship between the pseudowire label and the LSP may be configured. The label mapping message may further include a source node identifier; and error information is returned to the source node according to the source node identifier when it is judged that the LSP in which the node is located does not support the priority of the service and/or the bandwidth of the service (namely, the LSP may not support the priority; or the LSP may support the priority but the remaining bandwidth quota corresponding to the priority is not enough).

In the embodiment of the present invention, whether the LSP in which the node is located supports the priority of the service and the bandwidth of the service is judged according to the bandwidth supporting information, which is stored in the node, of the LSP in which the node is located and the bandwidth required by the service and priority of the service that are carried in the label mapping message; and the LSP is used as an LSP which bears the pseudowire when it is judged that the LSP supports the priority of the service and the bandwidth of the service. Because the bandwidth supporting information, which is stored in the node, of the LSP in which the node is located may be configured, the priority of the service allowed to pass through the LSP and the bandwidth corresponding to the priority may be decided. Therefore, services of different priorities may be treated discriminatorily according to requirements, and the QoS of the established pseudowire may be ensured when the bandwidth decreases.

Embodiment 3

Figure 2:
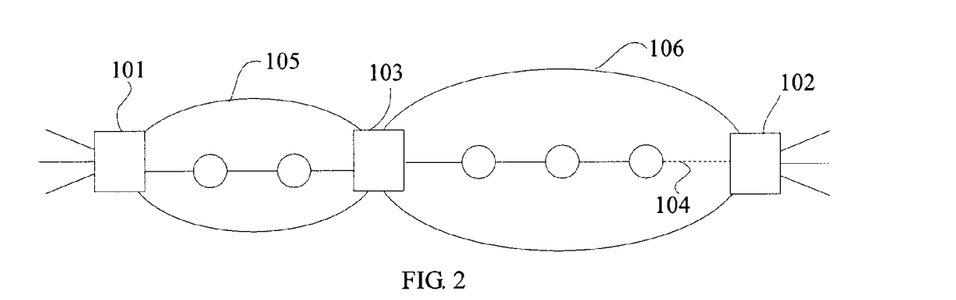
FIG. 2 is a schematic diagram of a scenario according to an embodiment of the present invention.
Figure 3:
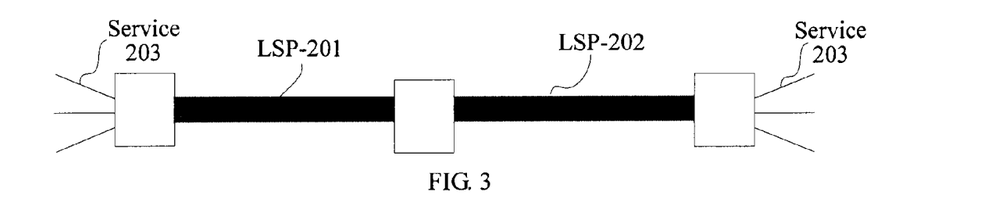
FIG. 3 is an abstract diagram of FIG. 2 according to an embodiment of the present invention.

A scenario of the embodiment of the present invention is as shown in FIG. 2. FIG. 3 is an abstract diagram of FIG. 2. This is a Multi-Protocol Label Switching (MPLS) network which is divided into two segments: a network segment 105 and a network segment 106. The two network segments may be connected through a node 103, a service is added and dropped on node 101 and node 102, an LSP-201 is set up between the node 101 and the node 103, and an LSP-202 is set up between the node 102 and the node 103. In the network segment 106, a link 104 is a microwave link. Due to adaptive modulation, the link bandwidth changes with the environment (the current devices may support bandwidth adjustment of up to 16 levels), which leads to corresponding change of the bandwidth of the LSP-202.

A pseudowire is set up as follows: Assume that a pseudowire needs to be set up for a service 203 (bandwidth 20 Mbps), and the node 101 initiates a setup signaling.

Figure 4:
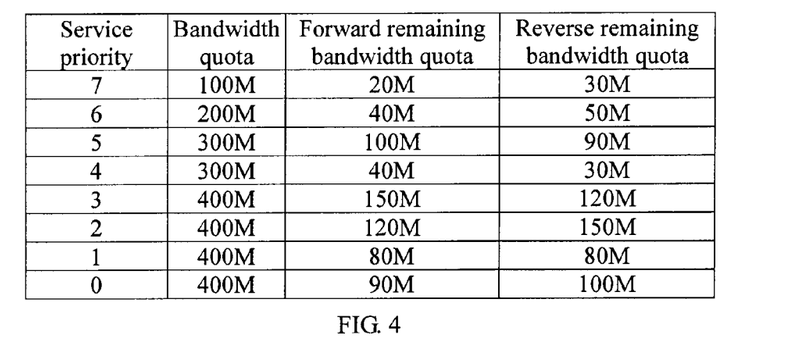
FIG. 4 is a schematic diagram of a bandwidth quota table of an LSP-202 according to an embodiment of the present invention.

Step 0a: Configure bandwidth quota for each service priority on a endpoint 102 and endpoint 103 of the LSP-202 according to the bandwidth of the microwave link in different environments, and maintain the current forward (in the direction from 101 to 102) and reverse (in the direction from 102 to 101) remaining bandwidth quota. FIG. 4 is a schematic diagram of a bandwidth quota table of an LSP-202 according to an embodiment of the present invention.

Step 0b: Determine the priority of the service 203 according to configuration. Assume that the priority of the service 203 is configured as 6.

Figure 5:
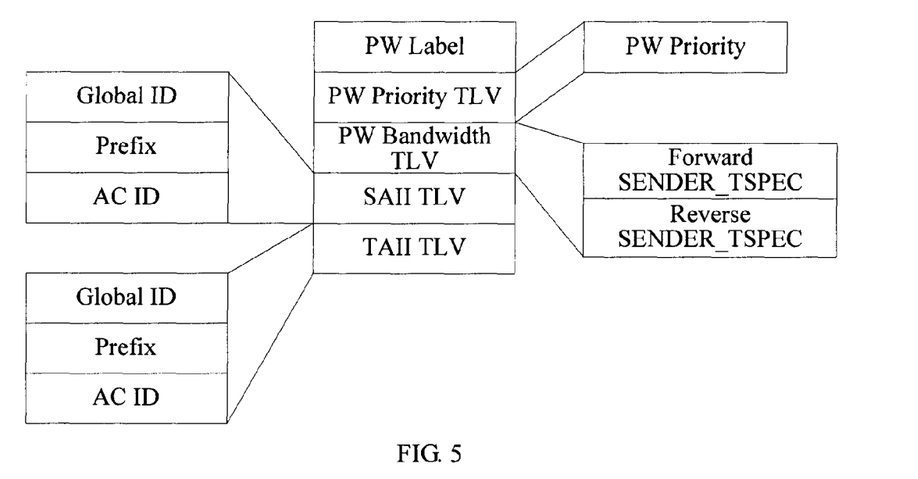
FIG. 5 shows information about each TLV carried in a label mapping message according to an embodiment of the present invention.

Step 1: The node 101 selects, according to information such as the Target Attachment Individual Identifier (TAII) and the bandwidth requirement (namely, requested bandwidth), the LSP-201 to bear a first hop of pseudowire, and initiates a label mapping signaling directly. A new Pseudowire (PW) Priority Type Length Value (TLV) is defined in the Label Mapping Message to carry priority information. Additionally, the label mapping message needs to carry the previously defined PW Bandwidth TLV to indicate information such as the bandwidth requirement and the TAII. FIG. 5 shows information about each TLV carried in a label mapping message, as described below:

PW Label: pseudowire label, which is a label of a current pseudowire;

PW Priority TLV: PW Priority information, which is obtained from mapping of the service priority;

PW Bandwidth TLV: carries the forward bandwidth requirement (Forward SENDER_TSPEC) and the reverse bandwidth requirement (Reverse SENDER_TSPEC);

Source Attachment Individual Identifier (SAII) TLV: carries the SAII information, including global ID, prefix, and Attachment Circuit (AC) ID; and TAII TLV: carries Target Attachment Individual Identifier (TAII) information, which includes global ID, prefix, and AC ID and is used for routing in the process of setting up a pseudowire, in which each hop of node needs to select the next-hop node of the pseudowire according to the TAII.

It should be noted that if a table similar to FIG. 4 is also configured for the LSP-201 on the node 101, whether the reverse remaining bandwidth quota corresponding to priority 6 on the selected LSP is enough needs to be checked according to information about the service priority 6 (the direction of the label mapping signaling is opposite to the service direction). If the reverse remaining bandwidth quota of priority 6 on the selected LSP is enough, the signaling is initiated; if the reverse remaining bandwidth quota of priority 6 on the selected LSP is not enough, another LSP is selected; if a LSP satisfying the conditions is not available, error information is returned.

Step 2: After receiving the label mapping signaling initiated by the node 101, the node 103 selects an LSP that bears this hop of pseudowire according to information indicating that a destination Provider Edge (PE) node is the node 103, the requested bandwidth and the priority that are carried in the label mapping signaling.

If the requested bandwidth is 30 Mbps, because the reverse remaining bandwidth quota for the priority 6 on the LSP-202 is 40 Mbps, the bandwidth requirement can be satisfied. Therefore, the node 103 selects the LSP-202 as an LSP which bears the pseudowire, configures a mapping relationship between the corresponding pseudowire label and the LSP, and subtracts 30 Mbps from the reverse remaining bandwidth, and then the process proceeds to step 3.

If the requested bandwidth is 50 Mbps and the LSP between the node 102 and the node 103 does not support the priority, or, if the LSP supports the priority but the remaining bandwidth quota corresponding to the priority is not enough, the node 103 returns error information "the bandwidth of this priority cannot be satisfied" to the previous hop 101.

Step 3: The node 103 sends a label mapping message to the node 102 to set up a second hop of the pseudowire. The information carried in the label mapping message is similar to that carried in the message sent in step 1 except for changes of the PW label. Additionally, a PW exchange relationship needs to be set up on the node 103 according to the PW label of the previous hop and the PW label of this hop.

Step 4: The node 102 receives the label mapping message sent by the node 103, and judges, according to the TAII information carried in the message, that the current node is the last-hop node. Therefore, the node 102 configures a mapping relationship among the corresponding service, the pseudowire label, and the LSP, and initiates a reverse label mapping signaling to complete setting up the bidirectional mapping of the pseudowire. The reverse signaling process is similar to the signaling process described above except for the need of checking whether the forward bandwidth quota meets the bandwidth requirement.

In the embodiment of the present invention, the reverse remaining bandwidth is maintained through the forward signaling, and the forward remaining bandwidth is maintained through the reverse signaling. Both forward remaining bandwidth and the reverse remaining bandwidth may be maintained through the forward signaling or the reverse signaling uniformly.

In the pseudowire setup method provided in the embodiment of the present invention, the label mapping signaling carries priority information and bandwidth requirement information; each hop of node on the pseudowire selects the tunnel according to the foregoing information, and therefore, the pseudowire setup can be controlled based on the priority of the service, and the QoS of the established pseudowire is ensured to the greatest extent.

Embodiment 4

The embodiment of the present invention still takes the scenario shown in FIG. 2 as an example. FIG. 3 is an abstract diagram of FIG. 2. A MPLS network is divided into two segments: a network segment 105 and a network segment 106. The two network segments may be connected through a node 103, a service is added and dropped on node 101 and a node 102, an LSP-201 is set up between the node 101 and the node 103, and an LSP-202 is set up between the node 102 and the node 103. In the network segment 106, a link 104 is a microwave link. Due to adaptive modulation, the link bandwidth changes with the environment (currently, the device may support bandwidth adjustment of up to 16 levels), which leads to corresponding change of the bandwidth of the LSP-202.

A process of setting up a pseudowire is as follows: Assume that a pseudowire needs to be set up for a service 203 (bandwidth 20 Mbps), and the node 101 initiates a setup signaling.

Figure 4A:
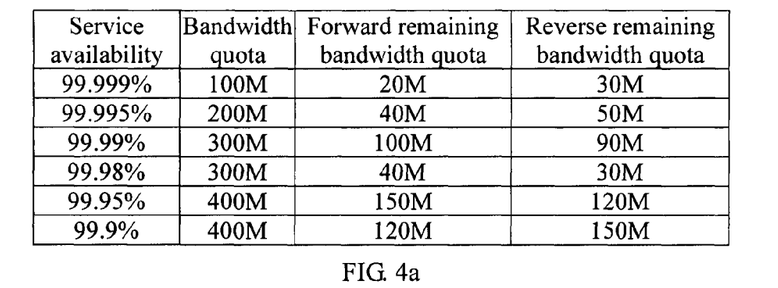
FIG. 4a is a schematic diagram of another bandwidth quota table of an LSP-202 according to an embodiment of the present invention.

Step 0a: Configure bandwidth quota for each service availability level on an endpoint 102 and endpoint 103 of the LSP-202 according to the bandwidth of the microwave link in different environments, and maintain the current forward remaining bandwidth quota (in the direction from the node 101 to the node 102) and the reverse remaining bandwidth quota (in the direction from the node 102 to the node 101). FIG. 4a is a schematic diagram of a bandwidth quota table of an LSP-202 in the case of different availabilities according to an embodiment of the present invention.

Step 0b: Determine the service availability of the service 203 according to configuration. Assume that the service availability of the service 203 is configured as 99.995%.

Figure 5A:
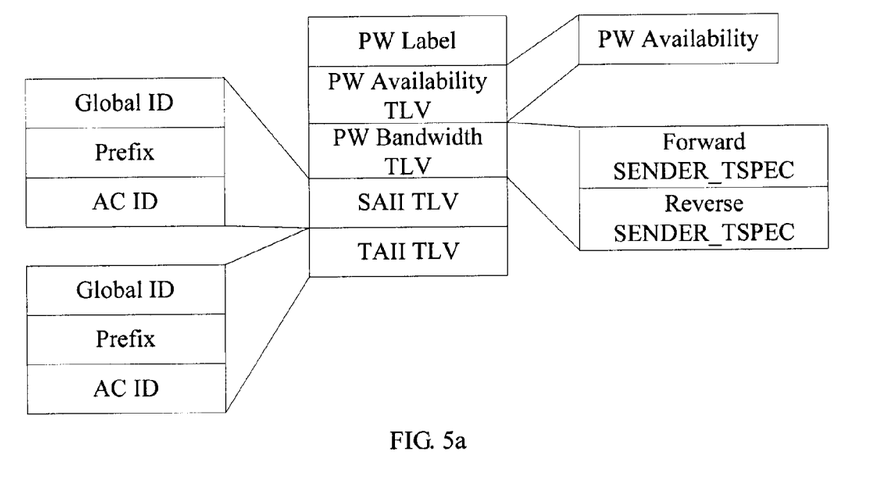
FIG. 5a shows information about each TLV carried in another label mapping message according to an embodiment of the present invention.

Step 1: The node 101 selects, according to information such as the TAII and the bandwidth requirement (namely, requested bandwidth), the LSP-201 to bear a first hop of pseudowire, and initiates a label mapping signaling directly. A new PW Availability TLV is defined in the label mapping message to carry availability information. Additionally, the label mapping message needs to include the previously defined PW Bandwidth TLV to indicate information such as the bandwidth requirement and the TAII FIG. 5a shows information about each TLV carried in a label mapping message, as described below:

PW Label: pseudowire label, which is a label of a current pseudowire;

PW Availability TLV: PW Availability information, which is obtained through mapping of the service availability;

PW Bandwidth TLV: carries the forward bandwidth requirement (Forward SENDER_TSPEC) and the reverse bandwidth requirement (Reverse SENDER_TSPEC);

SAII TLV: carries the SAII information, including global ID, prefix, and AC ID; and TAII TLV: carries TAII information, which includes global ID, prefix, and AC ID and is also used for routing in the process of setting up a pseudowire, in which each hop of node needs to select the next-hop node of the pseudowire according to the TAII.

It should be noted that if a table similar to FIG. 4a is also configured for the LSP-201 on the node 101, whether the reverse remaining bandwidth quota corresponding to availability of 99.995% on the selected LSP is enough needs to be checked according to information about the service availability of 99.995% (the direction of the label mapping signaling is opposite to the service direction). If the reverse remaining bandwidth quota corresponding to availability of 99.995% on the selected LSP is enough, the signaling is initiated; if the reverse remaining bandwidth quota corresponding to availability of 99.995% on the selected LSP is not enough, another LSP is selected; if no LSP meeting the condition is available, error information is returned.

Step 2: After receiving the label mapping signaling initiated by the node 101, the node 103 selects, according to the information indicating that a destination PE node is the node 103, the requested bandwidth and the priority that are carried in the label mapping signaling, an LSP that bears this hop of pseudowire.

If the requested bandwidth is 30 Mbps, because the reverse remaining bandwidth quota for the availability of 99.995% on the LSP-202 is 40 Mbps, the bandwidth requirement can be satisfied. Therefore, the node 103 selects the LSP-202 as an LSP which bears the pseudowire, configures a mapping relationship between the corresponding pseudowire label and the LSP, and subtracts 30 Mbps from the reverse remaining bandwidth, and then the procedure proceeds to step 3.

If the requested bandwidth is 50 Mbps and the availability supported by the LSP between the node 102 and the node 103 is lower than the requested availability, or, if the LSP supports the corresponding availability but the remaining bandwidth quota corresponding to the availability is not enough, the node 103 returns error information "the requested bandwidth cannot be satisfied" to the previous hop 101.

Step 3: The node 103 sends a label mapping message to the node 102 to set up a second hop of the pseudowire. The information carried in the label mapping message is similar to that carried in the message sent in step 1 except for changes of the PW label. Additionally, a PW exchange relationship needs to be set up on the node 103 according to the PW label of the previous hop and the PW label of this hop.

Step 4: The node 102 receives the label mapping message sent by the node 103, and judges, according to the TAII information carried in the message, that the current node is the last-hop node. Therefore, the node 102 configures the mapping relationship among the corresponding service, the pseudowire label, and the LSP, and initiates a reverse label mapping signaling to complete setting up the bidirectional mapping of the pseudowire. The reverse signaling process is similar to the signaling process described above except for the need of checking whether the forward bandwidth quota meets the bandwidth requirement.

In the embodiment of the present invention, the reverse remaining bandwidth is maintained through the forward signaling, and the forward remaining bandwidth is maintained through the reverse signaling. Both forward remaining bandwidth and the reverse remaining bandwidth may be maintained through the forward signaling or the reverse signaling uniformly.

In the pseudowire setup method provided in the embodiment of the present invention, the label mapping signaling carries availability information and bandwidth requirement information; each hop of node on the pseudowire selects a tunnel according to the foregoing information, and therefore, the pseudowire setup may be controlled based on the availability of the service, and the QoS of the established pseudowire is ensured to the greatest extent.

Embodiment 5

Figure 6:
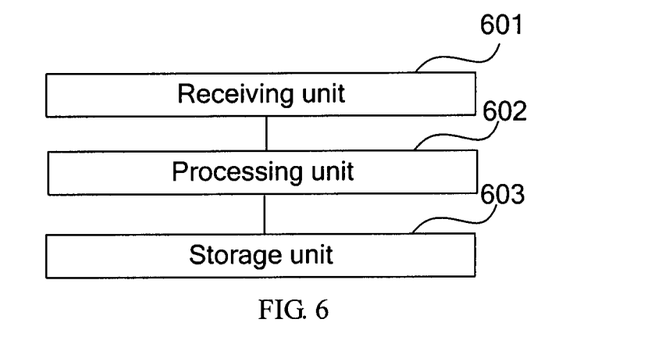
FIG. 6 is a schematic structural diagram of another node device according to an embodiment of the present invention.
Figure 6A:
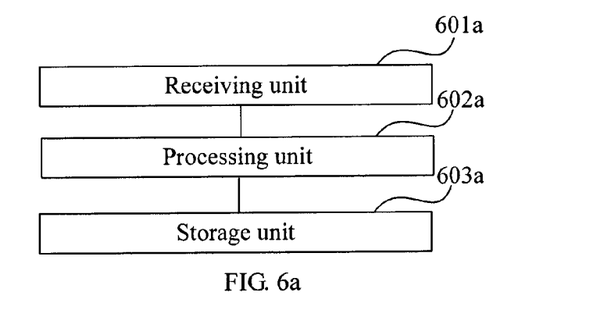
FIG. 6a is a schematic structural diagram of a node device according to an embodiment of the present invention.

Corresponding to the foregoing method embodiment, FIG. 6a is a schematic structural diagram of a node device according to an embodiment of the present invention. The node device includes:

a storage unit 603a, configured to store bandwidth supporting information of an LSP in which the node device is located;

a receiving unit 601a, configured to receive a label mapping message that carries a bandwidth required by a service and a service level of the service; and a processing unit 602a, configured to: judge, according to the bandwidth supporting information which is stored by the storage unit 603a and is of the LSP in which a node device is located, and the bandwidth required by the service and the service level of the service that are carried in the label mapping message, whether the LSP in which the node device is located supports the service level of the service and the bandwidth of the service, and use the LSP as an LSP which bears a pseudowire when determining that the LSP supports the service level of the service and the bandwidth of the service.

The service level includes any one or combination of a service priority, service availability level, and service type.

Optionally, the storage unit 603a is specifically configured to store multiple service levels of multiple services supported by the LSP in which the node device is located and the remaining bandwidth quota corresponding to the multiple service levels.

Figure 7:
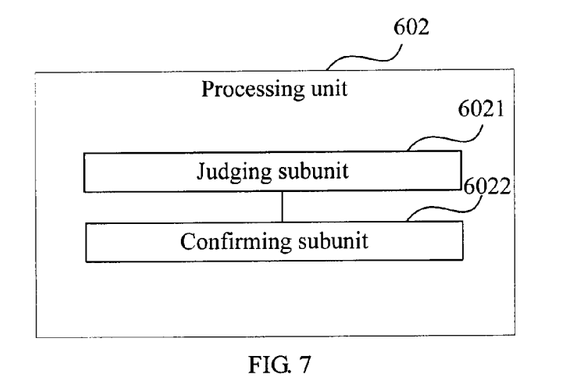
FIG. 7 is a schematic structural diagram of another processing unit according to an embodiment of the present invention.
Figure 7A:
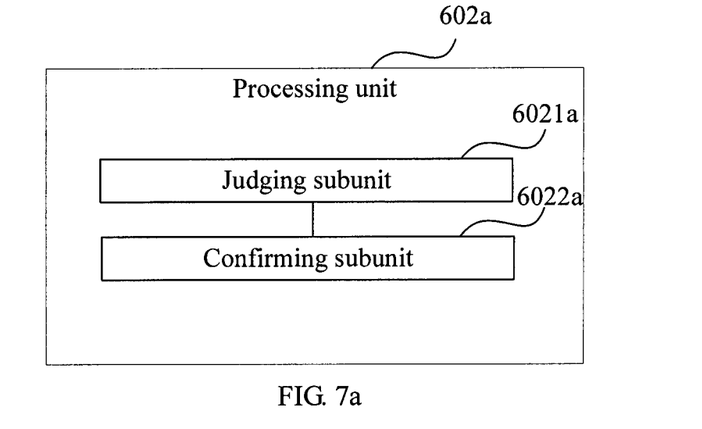
FIG. 7a is a schematic structural diagram of a processing unit according to an embodiment of the present invention.

Optionally, FIG. 7a is a schematic structural diagram of a processing unit according to an embodiment of the present invention. The processing unit 602a may include: a judging subunit 6021a, configured to: compare the obtained service level of the service and bandwidth required by the service with the stored service level and remaining bandwidth quota; and judge that the LSP in which the node device is located supports the bandwidth required by the service of the service level when determining that the LSP supports the service level of the service, and the remaining bandwidth quota corresponding to the service level of the service is greater than the bandwidth required by the service; and a confirming subunit 6022a, configured to use the LSP as an LSP which bears a pseudowire when judging that the LSP in which the node device is located supports the service level of the service and the bandwidth of the service.

Figure 8:
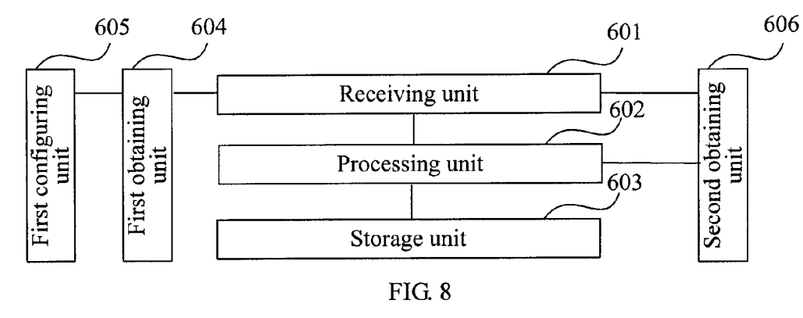
FIG. 8 is a schematic structural diagram of still another node device according to an embodiment of the present invention.
Figure 8A:
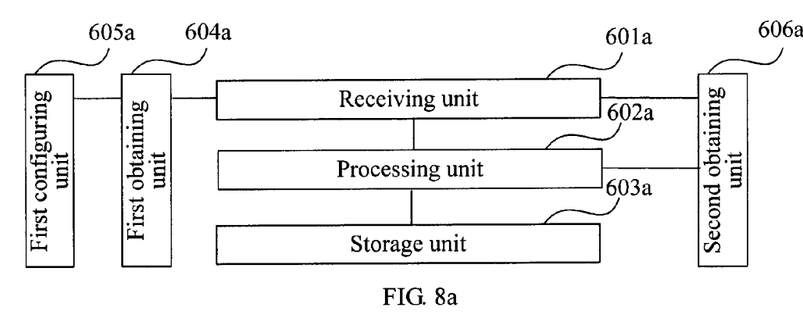
FIG. 8a is a schematic structural diagram of still another node device according to an embodiment of the present invention.

Optionally, FIG. 8a is another schematic structural diagram of a node device according to an embodiment of the present invention. The device includes the foregoing storage unit 603a, receiving unit 601a, and processing unit 602a. The label mapping message may further include a pseudowire label, and the device may further include: a first obtaining unit 604a, configured to obtain the pseudowire label from the label mapping message; and a first configuring unit 605a, configured to configure a mapping relationship between the pseudowire label and the LSP. The label mapping message may further include a source node identifier, and the device may further include: a second obtaining unit 606a, configured to obtain a source node identifier from the label mapping message. The processing unit 602a is further configured to return error information to the source node according to the source node identifier when it is judged that the LSP in which the node device is located does not support the service level of the service and/or the bandwidth requirement of the service (namely, the LSP may not support the service level; or the LSP may support the service level but the remaining bandwidth quota corresponding to the service level is not enough).

In the embodiment of the present invention, whether the LSP in which the node is located supports the service level of the service and the bandwidth of the service is judged according to the bandwidth supporting information which is stored by the node and is of the LSP in which the node is located and the bandwidth required by the service and service level of the service that are carried in the label mapping message; and the LSP is used as an LSP which bears the pseudowire when it is judged that the LSP supports the service level of the service and the bandwidth of the service. Because the bandwidth supporting information which is stored by the node and is of the LSP in which the node is located may be configured, the service level of the service allowed for passing through the LSP and the bandwidth corresponding to the service level may be decided. Therefore, services with different service levels may be treated discriminatorily according to requirements, and the QoS of the established pseudowire may be ensured when the bandwidth decreases.

Embodiment 6

Corresponding to the foregoing method embodiment, FIG. 6 is a schematic structural diagram of a node device according to an embodiment of the present invention. The device includes:

a storage unit 603, configured to store bandwidth supporting information of an LSP in which the node device is located;

a receiving unit 601, configured to receive a label mapping message that carries a bandwidth required by a service and a priority of the service; and a processing unit 602, configured to: judge, according to the bandwidth supporting information which is stored by the storage unit 603 and is of the LSP in which the node device is located, and the bandwidth required by the service and the priority of the service that are carried in the label mapping message, whether the LSP in which the node device is located supports the priority of the service and the bandwidth of the service, and use the LSP as an LSP which bears the pseudowire when judging that the LSP supports the priority of the service and the bandwidth of the service.

Optionally, the storage unit 603 is specifically configured to store multiple service priorities of multiple services supported by the LSP in which the node device is located and the remaining bandwidth quota corresponding to the multiple priorities.

Optionally, FIG. 7 is a schematic structural diagram of a processing unit according to an embodiment of the present invention. The processing unit 602 may include: a judging subunit 6021, configured to: compare the obtained priority of the service and bandwidth required by the service with the stored priority and remaining bandwidth quota; and judge that the LSP in which the node device is located supports the bandwidth required by the service of the priority when determining that the LSP supports the priority of the service, and the remaining bandwidth quota corresponding to the priority of the service is greater than the bandwidth required by the service; and a confirming subunit 6022, configured to use the LSP as an LSP which bears the pseudowire when it is judged that the LSP in which the node device is located supports the priority of the service and the bandwidth of the service.

Optionally, FIG. 8 is another schematic structural diagram of a node device according to an embodiment of the present invention. The device includes the foregoing storage unit 603, receiving unit 601, and processing unit 602. The label mapping message may further carry a pseudowire label, and the device may further include: a first obtaining unit 604, configured to obtain the pseudowire label from the label mapping message; and a first configuring unit 605, configured to configure a mapping relationship between the pseudowire label and the LSP. The label mapping message may further carry a source node identifier, and the device may further include: a second obtaining unit 606, configured to obtain a source node identifier from the label mapping message. The processing unit 602 is further configured to return error information to the source node according to the source node identifier when it is judged that the LSP in which the node device is located does not support the priority of the service and/or the bandwidth requirement of the service (namely, the LSP may not support the priority; or the LSP may support the priority but the remaining bandwidth quota corresponding to the priority is not enough).

In the embodiment of the present invention, whether the LSP in which the node is located supports the priority of the service and the bandwidth of the service is judged according to the bandwidth supporting information which is stored by the node and is of the LSP in which the node is located and the bandwidth required by the service and priority of the service that are carried in the label mapping message; and the LSP is used as an LSP which bears the pseudowire when it is judged that the LSP supports the priority of the service and the bandwidth of the service. Because the bandwidth supporting information which is stored by the node and is of the LSP in which the node is located may be configured, the priority of the service allowed for passing through the LSP and the bandwidth corresponding to the priority may be decided. Therefore, services of different priorities may be treated discriminatorily according to requirements, and the QoS of the established pseudowire may be ensured when the bandwidth decreases.

Persons of ordinary skill in the art should understand that all or part of the steps of the method specified in the foregoing embodiments may be implemented through a program instructing relevant hardware. The program may be stored in a computer readable storage medium such as a ROM/RAM, a magnetic disk or a CD-ROM. When the program runs, the program performs all or part of the foregoing steps.

The foregoing detailed embodiments further described the objectives, technical solutions and benefits of the present invention. It is understandable that the foregoing description is merely detailed embodiments of the present invention and is not used to construct limitations to the scope of the present invention. Any modification, equivalent replacement or improvement made without departing from the spirit and principles of the present invention shall all fall within the protection scope defined by the following claims or their equivalents.

What is claimed is:

1. A pseudowire setup method, comprising:
receiving, by a node, a label mapping message which carries a bandwidth required by a service and a service level of the service;
judging, by the node, whether a Label Switching Path (LSP) in which the node is located supports the service level of the service and the bandwidth of the service, according to bandwidth supporting information, which is stored in the node, of the LSP in which the node is located, and the label mapping message; and
using the LSP as an LSP which bears a pseudowire when judging that the LSP supports the service level of the service and the bandwidth of the service.

2. The method according to claim 1, wherein:
the bandwidth supporting information comprises service levels of multiple services supported by the LSP in which the node is located and the remaining bandwidth quota corresponding to the multiple service levels;
according to the bandwidth supporting information, which is stored in the node, of the LSP in which the node is located, and the bandwidth required by the service and the service level of the service which are carried in the label mapping message, the node judges whether the LSP in which the node is located supports the service level of the service and the bandwidth of the service, comprising:
comparing, by the node, an obtained service level of the service and bandwidth required by the service with a stored service level and remaining bandwidth quota; and
judging that the LSP supports the bandwidth required by the service in the service level when determining that the LSP supports the service level of the service and the remaining bandwidth quota corresponding to the service level of the service is greater than the bandwidth required by the service.

3. The method according to claim 2, wherein:
the label mapping message further comprises a pseudowire label, and the method further comprises:
obtaining the pseudowire label from the label mapping message; and
configuring a mapping relationship between the pseudowire label and the LSP.

4. The method according to claim 2, wherein:
the label mapping message further comprises a source node identifier, and the method further comprises:
returning error information to a source node according to the source node identifier when judging that the LSP in which the node is located fails to support the service level of the service and/or the bandwidth of the service.

5. The method according to claim 1, wherein:
the label mapping message further comprises a pseudowire label, and the method further comprises:
obtaining the pseudowire label from the label mapping message; and
configuring a mapping relationship between the pseudowire label and the LSP.

6. The method according to claim 1, wherein:
the label mapping message further comprises a source node identifier, and the method further comprises:
returning error information to a source node according to the source node identifier when judging that the LSP in which the node is located fails to support the service level of the service and/or the bandwidth of the service.

7. The method according to claim 1, wherein:
the service level comprises one or more of a service priority, service availability level, and service type.

8. A node device, comprising:
a storage unit, configured to store bandwidth supporting information of a Label Switching Path (LSP) in which the node device is located;
a receiving unit, configured to receive a label mapping message that carries a bandwidth required by a service and a service level of the service; and
a processing unit, configured to: judge whether the LSP in which the node device is located supports the service level of the service and the bandwidth of the service, according to the bandwidth supporting information, which is stored by the storage unit, of the LSP in which the node device is located, and the label mapping message; and use the LSP as an LSP which bears a pseudowire when judging that the LSP supports the service level of the service and the bandwidth of the service.

9. The device according to claim 8, wherein:
the storage unit is specifically configured to store service levels of multiple services supported by the LSP in which the node device is located and remaining bandwidth quota corresponding to the multiple service levels;
the processing unit comprises:
a judging subunit, configured to: compare an obtained service level of the service and bandwidth required by the service with a stored service level and remaining bandwidth quota; and judge that the LSP in which the node device is located supports the bandwidth required by the service in the service level, when it is determined that the LSP supports the service level of the service and the remaining bandwidth quota corresponding to the service level of the service is greater than the bandwidth required by the service; and
a confirming subunit, configured to use the LSP as an LSP which bears a pseudowire when it is determined that the LSP in which the node device is located supports the service level of the service and the bandwidth of the service.

10. The device according to claim 9, wherein:
the label mapping message further comprises a pseudowire label, and the device further comprises:
a first obtaining unit, configured to obtain the pseudowire label from the label mapping message; and
a first configuring unit, configured to set a mapping relationship between the pseudowire label and the LSP.

11. The device according to claim 9, wherein:
the label mapping message further comprises a source node identifier, and the device further comprises:
a second obtaining unit, configured to obtain the source node identifier from the label mapping message, wherein
the processing unit is further configured to return error information to a source node according to the source node identifier when it is judged that the LSP in which the node device is located fails to support the service level of the service and/or the bandwidth of the service.

12. The device according to claim 8, wherein:
the label mapping message further comprises a pseudowire label, and the device further comprises:
a first obtaining unit, configured to obtain the pseudowire label from the label mapping message; and
a first configuring unit, configured to set a mapping relationship between the pseudowire label and the LSP.

13. The device according to claim 8, wherein:
the label mapping message further comprises a source node identifier, and the device further comprises:

a second obtaining unit, configured to obtain the source node identifier from the label mapping message, wherein the processing unit is further configured to return error information to a source node according to the source node identifier when it is judged that the LSP in which the node device is located fails to support the service level of the service and/or the bandwidth of the service.

* * * * *